J. MORTON.

Water-Tanks for Railways.

No. 5,544. Reissued August 19, 1873.

Witnesses:

T. C. Brecht.

John R. Young

Inventor:

John Morton, by

Prindle and Lay his Attys.

A.M. PHOTO-LITHOGRAPHIC CO. N.Y. (OSBORNE'S PROCESS.)

UNITED STATES PATENT OFFICE.

JOHN MORTON, OF CINCINNATI, OHIO, ASSIGNOR, BY MESNE ASSIGNMENTS, TO THE McGOWAN PUMP COMPANY.

IMPROVEMENT IN WATER-TANKS FOR RAILWAYS.

Specification forming part of Letters Patent No. 63,418, dated April 2, 1867; reissue No. 4,543, dated September 5, 1871; reissue No. 5,544, dated August 19, 1873; application filed March 8, 1873.

CASE A.

*To all whom it may concern:*

Be it known that I, JOHN MORTON, now of Cincinnati, in the county of Hamilton and the State of Ohio, did invent certain new and useful Improvements in Water-Tanks for Railways, for which Letters Patent No. 63,418 were issued to me upon the 2d day of April, 1867, which Letters Patent were duly surrendered, and thereafter duly reissued, as provided by law, bearing date of the 5th day of September, 1871, and No. 4,543, which reissued Letters Patent have been found defective in that the specification and claims do not cover and embrace all of the original invention and improvements as contained in the model and drawings filed in the United States Patent Office on the 1st day of February, 1867. Now, therefore, being desirous to reissue the said Letters Patent in the manner and form prescribed by law, I have prepared and do hereby declare that the following is a full, clear, and exact description of the said improvements, reference being had to the accompanying drawing making a part of this specification, in which—

Figure 1:
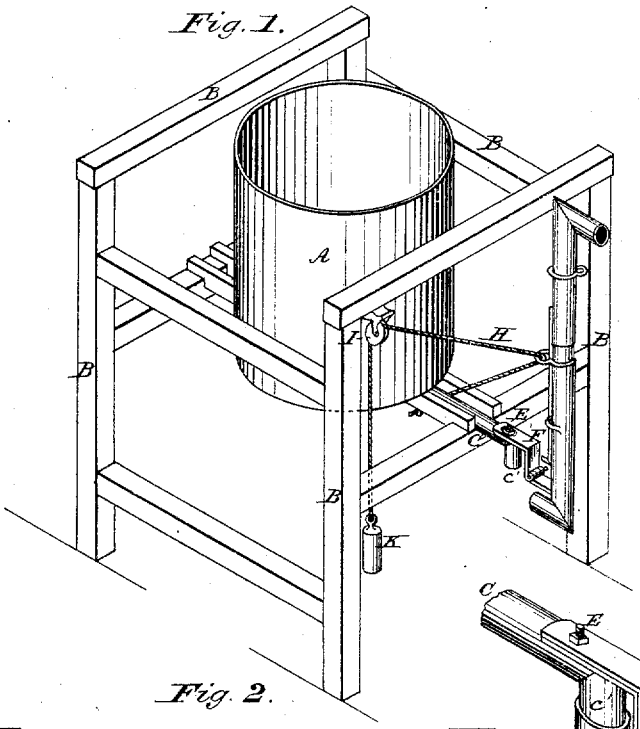
Figure 4:
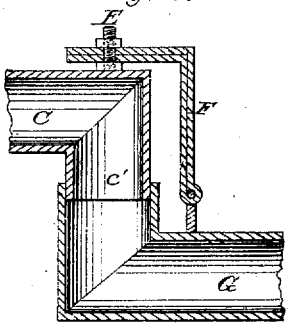
Figure 2:
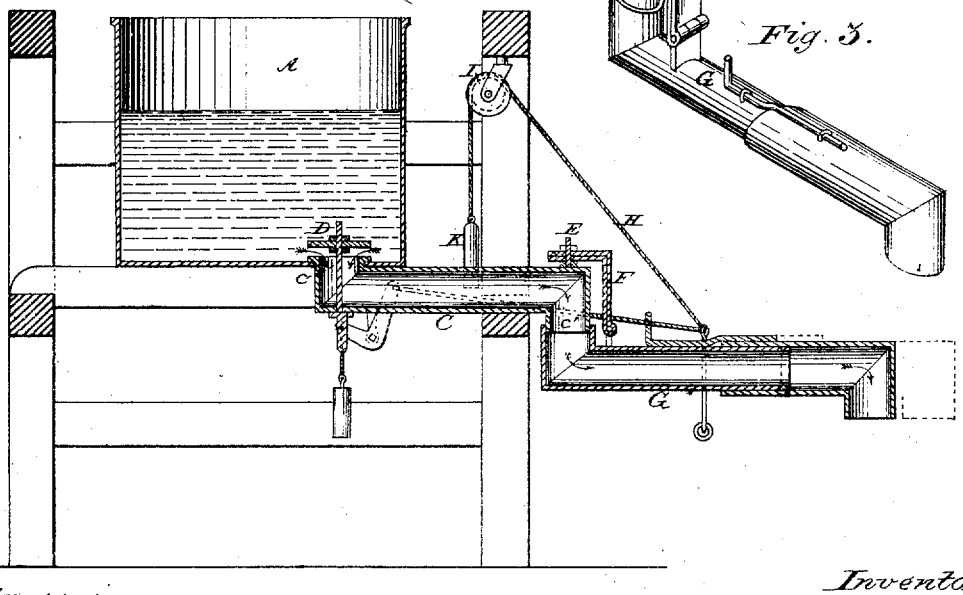
Figure 3:
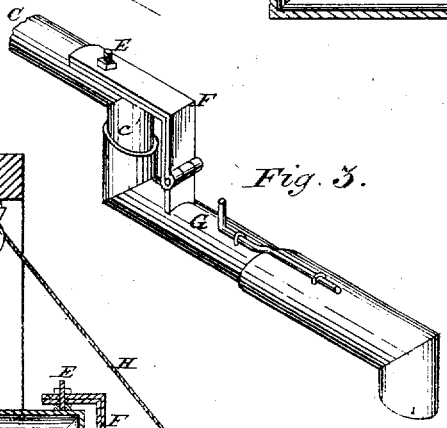

Figure 1 is a perspective view of my improved apparatus as arranged for use. Fig. 2 is an enlarged vertical central section of the same upon a line extending from front to rear. Fig. 3 is a perspective view of the supply and delivery pipes, and Fig. 4 is an enlarged vertical central section of the swivel-joint between said pipes.

Letters of like name and kind refer to like parts in each of the figures.

The object of my invention is to enable the supply and delivery pipes of railway water-tanks to be so connected together as to permit the outer end of said delivery-pipe to occupy any desired horizontal position without interfering with the relative radial positions of its inner end and the contiguous end of said supply-pipe; and said invention consists principally in combining the supply and delivery pipes by means of a swivel-bearing and a hinged or jointed connection, the axes of which are placed at right angles to each other, substantially as and for the purpose hereinafter specified. It consists, further, in the construction of the connection and its combination with the supply and delivery pipes, substantially as and for the purpose hereinafter shown. It consists, finally, in so constructing and combining the contiguous ends of the supply and delivery pipes that when the latter is turned down upon the former its end shall serve as a guide to fit said pipe upon the end of the said supply-pipe, which is smaller than the delivery-pipe, and allow said delivery-pipe to be moved upon this joint horizontally.

In the annexed drawing, A represents a water-tank resting upon and supported by means of suitable frame-work B. Extending vertically downward through and thence horizontally outward from the bottom of the tank is a supply-pipe, C, the open end, *c*, of which, within said tank, is inclosed by a puppet-valve, D, that is raised by any suitable means whenever it is desired to permit water to pass from the tank into and through said pipe. At its outer end said supply-pipe is extended vertically downward so as to form an elbow, *c'*, the mouth of which is unobstructed. Secured upon and extending vertically upward from the forward end of the supply-pipe C, in a line with the center or axis of its elbow *c'*, is a stud, E, upon which is pivoted one end of a bar, F, that from thence extends forward and downward to a point about upon a line with the lower end of said elbow, at which point it is hinged to or upon the upper side and near the inner end of a delivery-pipe, G. The outer end of the extensible portion of the delivery-pipe G terminates in a downward-extending elbow or nozzle, while its inner end is turned upward so as to bear against or upon and embrace the lower end of the elbow *c'* of the supply-pipe. A cord or chain, H, is secured to the delivery-pipe somewhat in rear of its longitudinal center, and from thence extends upward over a pulley, I, and is provided upon its end with a suitable weight, K, which nearly counterbalances the weight of said pipe.

As thus constructed and combined, the operation of these parts is as follows: When not in use, the delivery-pipe is turned to a vertical position, as shown in Fig. 1, during which movement the hinged or jointed bar F furnishes bearing as well as support for its inner end. When in use, said delivery-pipe is turned downward to a horizontal position, and its outer end moved laterally in either direction until directly over the man-hole of the locomotive-tender, during which latter operation the stud E serves as an axial bearing for said pipe, and enables any degree of movement of its outer end without breaking the joint between its inner end and the outer end of the supply-pipe.

This arrangement entirely obviates the necessity which ordinarily exists for moving a train of cars forward and back several times in order to bring the man-hole of the locomotive-tender exactly in a line with the center of the water-tank, the delivery-pipe being adjusted to the position of the tender, instead of adjusting the latter, the locomotive, and cars to the position of said pipe.

The downward-extended end $c'$ of the supply-pipe is so constructed as to fit easily and firmly into the upturned end of the delivery-pipe. In turning down the delivery-pipe, its end serves as a guide to render the union of the two ends sure and easy, and enables the one to be fitted in over and upon the other. This joint is tight and secure, and allows the delivery-pipe, hinged and swiveled, as hereinbefore described, to be moved upon it horizontally, and at the same time affords a support or bearing to its inner end.

Having thus fully set forth the nature and merits of my invention, what I claim as new is—

1. In a water-tank for railways, a supply and a delivery pipe combined by means of a swivel-bearing and a hinged or jointed connection, by means of which said delivery-pipe may pass from a vertical to a horizontal position, and may be moved laterally in a horizontal plane without changing the relative positions of its inner end and the contiguous or bearing end of said supply-pipe, substantially as and for the purpose specified.

2. In combination with the supply and delivery pipes C and G, respectively, the stud or swivel bearing E, and hinged or jointed connection F, when arranged with their axes at right angles with each other, substantially as and for the purpose shown.

3. In a railway water-tank, a fixed supply and a delivery pipe with its hinged swiveled connection, having the contiguous ends of their elbows so constructed that when said pipes are in a horizontal position their said ends fit together, the one containing the other, substantially as and for the purposes set forth.

In testimony whereof I hereunto set my hand this 28th day of February, 1873.

Witnesses: JOHN MORTON.

J. W. BREWSTER,

ROBT. SIMPSON.